Figure 1:
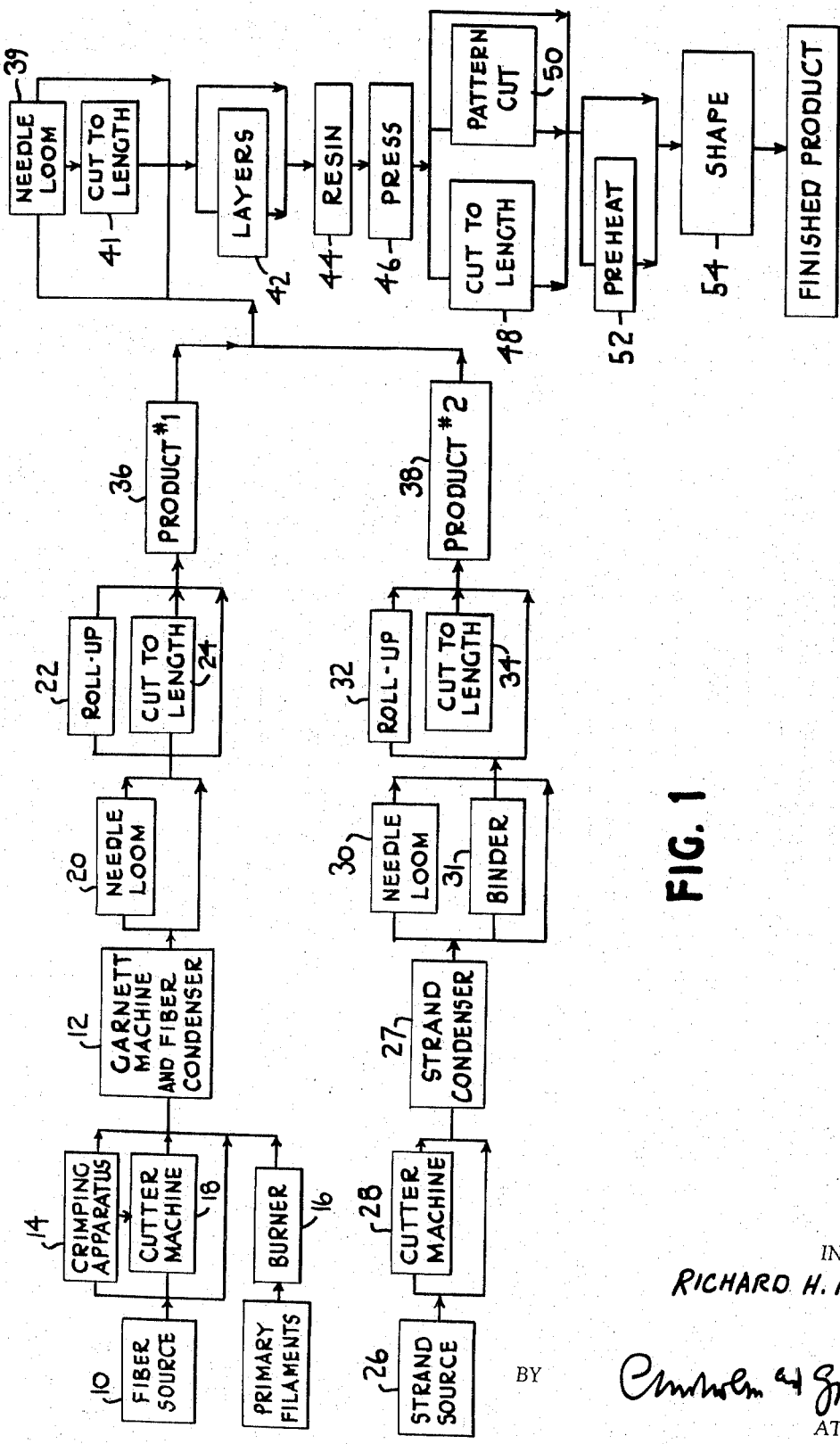

United States Patent [19]
Ackley

[11] 3,850,723
[45] Nov. 26, 1974

[54] METHOD OF MAKING A STAMPABLE REINFORCED SHEET

[75] Inventor: Richard H. Ackley, Oakmont, Pa.

[73] Assignee: PPG Industries, Inc., Pittsburgh, Pa.

[22] Filed: Nov. 21, 1973

[21] Appl. No.: 417,992

Related U.S. Application Data

[60] Continuation of Ser. No. 182,029, Sept. 20, 1971, abandoned, which is a division of Ser. No. 22,534, March 25, 1970, Pat. No. 3,664,909.

[52] U.S. Cl............ 156/180, 156/181, 156/222, 156/228, 161/156, 264/136, 264/258, 264/322

[51] Int. Cl............................................ B29h 9/02

[58] Field of Search .......... 156/180, 181, 222, 224, 156/228, 242, 245; 117/140 R; 161/141, 143, 151–156; 264/136, 137, 258, 324, 322

[56] References Cited
UNITED STATES PATENTS

| | | | |
|---|---|---|---|
| 2,552,124 | 5/1951 | Tallman | 161/156 X |
| 3,232,821 | 2/1966 | Moore, et al. | 161/155 |
| 3,338,777 | 8/1967 | Irwin, et al. | 161/154 |
| 3,621,092 | 11/1971 | Hofer | 264/322 |
| 3,684,645 | 8/1972 | Temple, et al. | 161/141 |

Primary Examiner—William A. Powell
Attorney, Agent, or Firm—John E. Curley; Thomas F. Shanahan

[57] ABSTRACT

Fibrous mats comprised of unstranded filaments that are free to move relative to each other and fibrous mats comprised of fibrous strands that are free to move relative to each other, as well as combinations thereof, are impregnated with resin and subsequently molded into resinous products.

2 Claims, 8 Drawing Figures

METHOD OF MAKING A STAMPABLE REINFORCED SHEET

CROSS-REFERENCE TO RELATED APPLICATIONS

This application is a continuation of application Ser. No. 182,029, filed Sept. 20, 1971, now abandoned, which is a division of application Ser. No. 22,534, filed Mar. 25, 1970, now U.S. Pat. No. 3,664,909.

BACKGROUND OF THE INVENTION

This invention relates to fibrous mat structures for use in reinforced resinous articles, as well as to processing resin-fiber products therefrom and to the products produced by such processing.

In the past, numerous problems were encountered in attempting to mold or shape high quality resinous articles containing fibrous material so that the end product was not only relatively economical to produce but also met high standards of visual and performance criteria required by the product's ultimate use or application. In particular, among the problems that confronted skilled artisans was the task of economically producing resin-fiber products while simultaneously imparting thereto one or more of a variety of characteristics or properties, such as, excellent surface smoothness, controlled uniformity in fiber content, fiber distribution and strength, as well as dimensional uniformity and dimensional stability. The present invention makes the achievement of the foregoing task possible by teaching the use of unique combinations of fibrous mat structures and resin so that virtually any of the above product characteristics or properties, or any desired combination thereof, may be obtained with relative ease and economy.

The foregoing and other objects, features and advantages of this invention will be more apparent from the following description when taken in conjunction with the drawings in which:

FIG. 1 is a schematic flow diagram illustrating various combinations of process steps contemplated by this invention; and FIGS. 2 through 8 are diagrammatic illustrations of typical cross sections through a variety of resin-fiber products that may be produced in accordance with this invention.

In the description that follows, the use of glass fibrous material will be discussed in connection with this invention although it will be understood that the invention is not so limited and that natural and synthetic fibrous materials of all kinds are also susceptible of use in practicing this invention.

In accordance with at least one aspect of this invention, it has been discovered that extremely smooth surfaced resin-fiber articles can be produced by using a surfacing mat comprised of unstranded glass filaments that are free to move relative to each other. In this aspect of the invention, the surfacing mat may be comprised of either staple or continuous filaments, it only being essential that the filaments are free to move relative to each other. In addition, for best performance it is desirable that the surfacing mat be as uniform or homogeneous throughout its mass as possible, so that each discrete portion of the mat reacts during molding in essentially the same manner as all other portions of the mat.

Illustrated in FIG. 1 is a preferred method for making mat of unstranded glass filaments in accordance with this invention. With specific reference to the upper portion of FIG. 1, this process broadly involves providing a plurality of glass filaments from a source 10, which may be a bushing, a suitable wound package or some other convenient source thereof, and by means of a filament dispersing and mat forming machine 12, such as a garnett-type machine coupled with suitable fiber or mat condenser apparatus, forming a homogeneous mat of unstranded filaments therefrom so that the filaments are free to move relative to each other. As is illustrated in FIG. 1, various additional processing steps may be performed on the glass filaments before being formed into a mat. If desired, for example, the filaments may be permanently crimped by any suitable apparatus 14 therefor, such as the apparatus disclosed in U.S. Pat. No. 3,136,110. Moreover, the filamentary material may be produced by flame attenuating primary filaments into fine diameter, staple fibrous form by apparatus 16, such as that disclosed in U.S. Pat. No. 2,489,243. Also, the filaments may be chopped to any desired staple length by use of a conventional chopping machine 18, per se well known in the art. In general, any desired processing that is not detrimental to ultimately producing a uniform mat of unstranded filaments that are free to move relative to each other may be employed, and it makes no difference whether such processing is performed prior to, during or subsequent to initial formation of the mat.

After initial formation of the mat of uniformly dispersed unstranded filaments, it has been found desirable to provide the mat with sufficient integrity to maintain the achieved uniformity in filament distribution during subsequent processing or handling. For this purpose, it has been found most desirable to needle the mat in a conventional needle loom 20 using barbed needles. Thereafter, the mat is either wound into a roll 22 for subsequent use, cut at 24 to desired length or passed on for further processing.

In a second and related aspect of this invention, it has been found that the production of resin-fiber articles can be further enhanced by the use of fibrous mat reinforcement comprised of glass fibrous strands that are free to move relative to each other. In particular, it has been found that where surface smoothness is desired and, in addition, uniformity of fiber content, fiber distribution and strength, as well as dimensional uniformity and dimensional stability are desired, it is advantageous to use a strand reinforcing mat in combination with an unstranded surfacing mat, both of which mats are characterized by their fibrous components being free to move relative to each other. The use of the above-described mat combination contributes substantially toward producing the foregoing properties or characteristics by reason of the unrestricted ability of the fibrous components of both mats to move and uniformly redistribute themselves in response to resin flow during the processes of molding or stamping.

Generally, in reinforced plastic articles, strength is imparted to a resinous matrix material by the inclusion therein of a suitable load-carrying reinforcement material. In the past, when relatively high strength was desired, this was usually accomplished by the use, as the reinforcement material, of relatively large bundles of filaments, e.g., from 25 to above 12,000 filaments per bundle, woven into a cloth or bonded into a strand mat form. Where the strand mat form was used, thermosetting bonding material was generally incorporated into the mat and cured prior to the mat being impregnated with resin and molded to its final desired shape. The use of the bonding material was to provide integrity to the mat structure for the purpose of handling the mat either prior to or contemporaneously with the molding operation.

However, in accordance with the present invention, the use of thermosetting binder in the mat reinforcement has been found to be undesirable; in fact, in many instances, detrimental to the ultimate use of the mat as reinforcement in a resinous system. In particular, where it is desired for the mat to uniformly flow out or move to the peripheral edges of the final molded article, the presence of the thermosetting binder therein tended to inhibit any substantial movement of the strands of the mat so that the final molded article was resin-rich about its peripheral edge portions. This resulted in producing an article that exhibited relatively poor strength, dimensional stability and/or dimensional uniformity, due to the non-uniformity of strand content and strand distribution of the refinforcement between the resin-rich peripheral edges and the other portions of the article. Moreover, attempts to eliminate the use of a thermosetting binder generally resulted in problems with handling the mat and with maintaining the uniformity of the strand distribution of the mat when subsequently impregnated with resin and molded into a shaped article.

In accordance with the present invention, it has been found that excellent strand mats for resin reinforcement can be produced by initially forming a binder-free strand mat and thereafter needling the strand mat to provide it with the required integrity for handling while leaving the strands of the mat free to move relative to each other. In particular, it has been found that continuous strand mat in swirl form, such as disclosed in U.S. Pat. No. 3,292,013, when produced in the above-mentioned binder-free form and needled, provides a strand mat reinforcement that exhibits improved tensile properties in all directions in the general plane of the mat when thereafter incorporated into a molded or shaped resinous article. Also, by combining the aforementioned reinforcement mat comprised of fibrous strands that are free to move relative to each other with the hereinabove disclosed surfacing mat of unstranded filaments that are free to move relative to each other, there is provided an improved composite mat structure which, when impregnated with resin and molded to its final desired shape, exhibits extremely uniform fiber content and fiber distribution, strength, dimensional stability, and at least one very smooth major surface.

Referring again to FIG. 1, there is illustrated a preferred method for making fibrous strand mat in accordance with this invention. With specific reference to the lower portion of FIG. 1, this process broadly involves providing a source 26 of glass strand, such as by drawing a plurality of glass filaments from a bushing and combining them into a continuous strand or by drawing strand from a previously prepared wound package thereof, and forming a mat of fibrous strands on suitable strand condenser apparatus 27 so that the strands are free to move relative to each other. As is indicated in FIG. 1, various additional processing steps may be performed on the strand before or while being formed into a mat. For example, the strand may be chopped to any desired staple length by use of a conventional chopping machine 28. However, as stated above, the strand is preferably retained in its continuous form and deposited as a continuous swirl mat. In general, any desired processing that is not detrimental to ultimately producing a uniform mat of fibrous strands that are free to move relative to each other may be employed, and it makes no difference whether such processing is performed prior to, during or subsequent to initial formation of the mat.

As stated previously, after initial formation of the mat of uniformly dispersed fibrous strands, it has been found desirable to provide the mat with sufficient integrity to maintain its uniform strand distribution during subsequent processing or handling. For this purpose, it has been found most desirable to needle the mat in a conventional needle loom 30 with barbed needles. Thereafter, the mat is either wound into a roll 32 for subsequent use, cut at 34 to desired length, or passed on for further processing.

Figure 2:
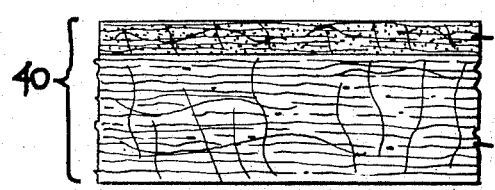

Various combinations of the above-described mat of unstranded filaments and mat of the fibrous strands with resin may be advantageously employed to produce desired resin fiber products. Illustrated in FIG. 2 is a typical cross section of a product that can be produced in accordance with this invention. As shown, the product of FIG. 2 utilizes, as a surfacing mat, a mat of unstranded filaments 36 and, as a reinforcing mat, a mat of fibrous strand 38 impregnated with a resin matrix material 40. In this embodiment, as well as in subsequently described embodiments, in order to achieve the maximum benefit of this invention, both the filaments of the surfacing mat 36 and the strands of the reinforcing mat 38 are free to move relative to each other when the resin 40 is in a flowable state. However, it is recognized that for certain product applications, it is not essential that all of the properties or characteristics obtainable by this invention be present, and thus only one of the mats may be required to exhibit the above-mentioned freedom of its fibrous components to move relative to each other. Generally, where a smooth surfaced article is required, it is essential, within the scope of this invention, that the unstranded filaments of the surfacing mat 36 be free to move. On the other hand, where strength and relatively uniform fiber content or fiber distribution are of paramount concern, it becomes more essential that the fibrous strands of the reinforcing mat 38 be free to move. Thus, it will be apparent that, depending on the ultimate product application, various combinations of the above-described mats of unstranded filaments and/or mat of fibrous strands with resin are possible to produce improved resin fiber articles. Also, while thermoplastic resin is preferred for use in connection with this invention, it will be apparent that thermosetting resin may also be advantageously employed.

Figure 6:
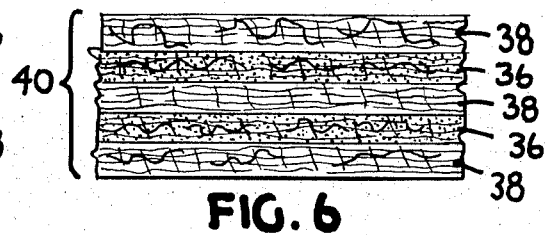
Figure 3:
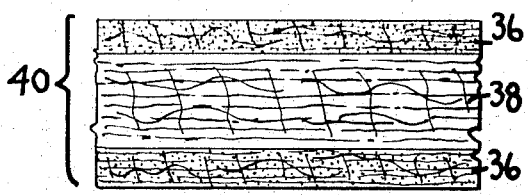
Figure 7:
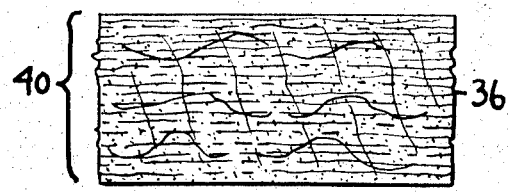
Figure 4:
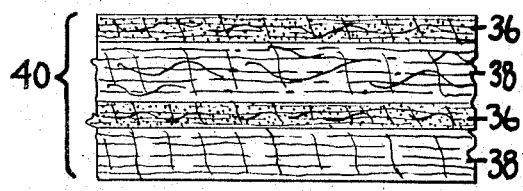
Figure 8:
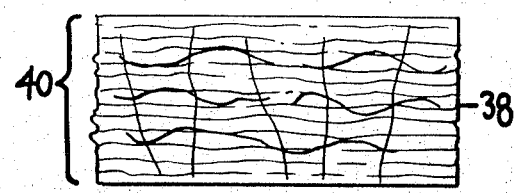
Figure 5:
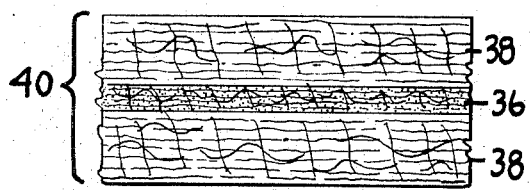

Illustrated in FIGS. 3 through 8 are various alternative arrangements of resin mat combinations within the contemplation of this invention. FIG. 3 illustrates the use of a mat of unstranded filaments 36 surfacing both major surfaces of a resinous article reinforced with a mat of fibrous strand 38. FIG. 4 illustrates the use of alternating layers of unstranded filamentary mat 36 and strand mat 38 in which one layer of unstranded mat 36 provides a smooth surface for the resinous article while an interior layer of unstranded mat 36 is employed to control the fiber content of the article. FIGS. 5 and 6 illustrate articles where surface smoothness is not of paramount importance and where the disclosed mat product of unstranded filaments 36 is sandwiched between two or more layers of mat of fibrous strand 38 solely to control the fiber content of the article. Illustrated in FIGS. 7 and 8 are resinous articles that respectively use the disclosed mat product of unstranded filaments 36 to provide a smooth surfaced article of low glass content and the disclosed mat of fibrous strands 38 in the form of a swirl mat to produce an article of improved strength which is free of resin-rich peripheral edge portions.

As indicated on the right side of FIG. 1, the preferred method for producing resinous articles using mat of this invention proceeds by disposing one or more layers 42 of mats 36 and/or 38 one above the other. Also, if desired, there may be included in layers 42 one or more plies or layers of chemically bonded stranded mat. Such plies or layers of chemically bonded strand mat may be provided from a separate source (not shown) or may be produced by the addition of binder, preferably thermoplastic binder, at 31 in lieu of needling strand mat in the needle loom 30. Moreover, mats 36 and/or 38 in layers 42 may reside therein either in unneedled form as a result of by-passing all needling operations, separately needled form as a result of separate processing in needle looms 20 and 30 or in combined needled form as a result of being needled together in needle loom 39 before being cut to length at 41 or passed on for subsequent inclusion in layers 42. In any event, after the desired mat structure has been formed so as to include therein at least one layer of mats 36 and/or 38, the so-formed mat structure is impregnated with resin, such as by the addition of resin at 44, and thereafter pressed and set at 46 to produce a sheet product. Where it is desired to use thermosetting resin, the resin is cured to a "B" stage, or semi-cured state, suitable for subsequent handling. Thereafter, the sheet material may be cut to desired length at 48 or pattern cut to the desired blank configuration at 50, and by subsequent mechanical stamping or the addition of heat and pressure in a press at 54, is shaped in a matched pair of mold parts to its final desired configuration. When using thermoplastic resin in connection with this invention, it has been found to be economically desirable to preheat the sheet blanks at 52, such as in an infrared heating oven, prior to their introduction into the mold in order to minimize molding time.

Mechanical stamping of fiber reinforced thermoplastic resinous articles is a new and, as yet, relatively undeveloped art. Notwithstanding, use of the principles of the present invention have been found to have particular utility in advancing the development of this art by providing a stampable, reinforced thermoplastic resinous sheet usable for economically stamping resin-fiber products while simultaneously imparting thereto characteristic properties such as excellent surface smoothness, controlled uniformity in fiber content, fiber distribution and strength, as well as dimensional uniformity and dimensional stability. A basic feature of this invention that makes mechanical stamping of resin-fiber products and the attainment of the foregoing advantages possible is the unrestricted ability of fibrous components of the stampable sheet to move and uniformly redistribute themselves in rapid response to resin flow during the process of stamping.

Briefly, mechanical stamping of resin-fiber articles proceeds by preparing a stampable, fiber-reinforced thermoplastic resinous blank, heating the blank to a temperature at which the thermoplastic resin is in a soft or flowable state, placing the blanks in a cold, e.g., 60° – 100°F., die or mold comprised of a matched pair of die or mold parts, rapidly closing the press to bottom dead center (or no more than a few degrees from bottom dead center) with a striking force that causes the blank to flow and fill the die cavity, holding the die parts in this position just long enough to allow the blank material to cool to a point so that it retains the desired shape of the cavity, opening the press and ejecting the stamped article. The speed and striking force with which the stamping is accomplished, e.g., a force capable of delivering in the order of about 300 to 2,000 pounds per square inch or more to the material of the heated blanks in repetitive stamping cycles of about 10 to 60 seconds, button to button, warrants the operation being termed a stamping process rather than a molding process.

The following examples are illustrative of how one may proceed in practicing the principles of this invention and will demonstrate the advantages that accrue therefrom.

EXAMPLES

Glass fiber reinforced thermoplastic sheets are made utilizing the following glass-fiber mats:

A. Unstranded filamentary mat produced by chopping a crimped roving or tow made as described in U.S. Pat. No. 3,136,110 and carding and lapping the unstranded filaments into a mat. The mat weight is 5 ounces per square yard and contains no size or chemical binder.

B. Needled mat of unstranded filaments described in (A) having about 145 penetrations per square inch of mat and containing no resinous binder.

C. Chopped strand mat composed of 5-inch length strand made up of about 50 filaments, each having a diameter of about 0.0005 inch. The strand is sized during forming with a size containing a polyvinyl acetate binder, a lubricant, two coupling agents, i.e., a vinyl triacetoxy silane and an amino silane, as described in U.S. Pat. No. 3,168,389, and a melamine formaldehyde hardener. The mat weight is 1½ ounces per square foot.

D. Needled, chopped strand mat described in (C) having about 145 penetrations per square inch of mat and containing no resinous binder.

E. Chopped strand mat described in (C) with the strands chemically bonded by the addition of 10 per cent by weight, based on the weight of the glass strands, of an acrylic binder.

F. Unstranded mat described in (A) needled to strand mat as described in (C) so as to produce about 145 penetrations per square inch of the combined mat product.

Mats as described in (A) through (F) were plied up with layers of thermoplastic resin and laminated to produce thoroughly impregnated resin-fibrous sheets. The layers of resin are 20-mil thick and composed of polypropylene resin unless noted. Various plies of mat and resin are combined alternately and laminated under heat and pressure. The mats and resin layers are placed in the mold of a laminating press maintained at about room temperature. The mold is closed under pressure, the temperature of the mold and laminating pressure are then gradually increased until thorough impregnation is achieved and, while maintaining elevated pressure, the temperature of the mold is thereafter decreased to about 100°F. or lower and the laminated sheet is then removed from the press.

Laminating

The following laminated sheet products produced as described hereinabove are formed to illustrate various embodiments of the invention and the advantages that accrue therefrom. The order of layers or plies are listed from the top layer to the bottom layer as the layers are arranged in the mold of the laminating press.

Sheet I
  Resin layer
  Glass fiber strand mat D
  Resin layer
  Glass fiber strand mat D
  Resin layer
  Glass fiber strand mat D
  Resin layer
Sheet II
  Resin layer
  Glass fiber strand mat D
  Resin layer
  Glass fiber strand mat D
  Resin layer
  Glass fiber strand mat D
  Glass fiber unstranded filamentary mat B
  Resin layer
Sheet III
  Resin layer
  Glass fiber strand mat D
  Resin layer
  Glass fiber strand mat D
  Resin layer
  Glass fiber composite mat F with unstranded filaments facing the next or bottom layer
  Resin layer
Sheet IV
  Resin layer
  Glass fiber strand mat D
  Resin layer
  Glass fiber strand mat E
  Resin layer
  Glass fiber strand mat D
  Resin layer
Sheet V
  Resin layer
  Glass fiber composite mat F with unstranded filaments facing the preceding or top layer
  Resin layer
  Glass fiber strand mat E
  Resin layer
  Glass fiber strand mat E
  Resin layer
Sheet VI
  Resin layer
  Glass fiber unstranded filamentary mat B
  Glass fiber strand mat D
  Resin layer
  Glass fiber strand mat E
  Resin layer
  Glass fiber strand mat E
  Resin layer
Sheet VII
  Styrene acrylonitrile resin layer
  Fiber glass strand mat D
  Styrene acrylonitrile resin layer
  Fiber glass strand mat D
  Styrene acrylonitrile resin layer
  Fiber glass strand mat D
  Styrene acrylonitrile resin layer
Sheet VIII
  Resin layer
  Fiber glass unstranded filamentary mat B
  Fiber glass strand mat E
  1½ Resin layers
  Fiber glass strand mat E
  Resin layer
  Fiber glass strand mat E
  1½ Resin layers
Sheet IX
  Resin layer
  Fiber glass unstranded filamentary mat B
  Fiber glass strand mat D
  Resin layer
  Fiber glass strand mat D
  Resin layer
  Fiber glass strand mat D
  Resin layer Test samples are prepared and tested for flexural strength and flexural modulus (ASTM D790-49) and the sheets are qualitatively examined for surface smoothness and impregnation. The following results are obtained.

| | Flexural Strength, psi. | Flexural Modulus × $10^6$ psi. |
|---|---|---|
| Sheet I | 27,300 | .88 |
| Sheet II | 27,900 | .85 |
| Sheet III | 25,900 | .77 |
| Sheet IV | 27,200 | .89 |
| Sheet V | 21,800 | .81 |
| Sheet VI | 21,800 | .81 |
| Sheet VII | Not measured | |
| Sheet VIII | Not measured | |
| Sheet IX | Not measured | |
| Surface Smoothness | Sheets I – IX exhibit excellent surface smoothness where the surface mat layer is mat B or mat F, good surface smoothness where the surface mat layer is mat D and fair to good surface smoothness where the surface mat layer is mat E. | |
| Impregnation | Sheets using mat B and mat F show better porosity for easier matrix impregnation and fewer trapped air blisters. | |

Stamping

Portions of Sheets I – IX are stamped in a 94F Toledo 160-ton mechanical stamping press and an 800-ton mechanical stamping press. The smaller press is used to stamp sheet blanks measuring approximately 11¾ inches × 16¼ inches × 0.09 – 0.1 inch into the shape of an open box. The larger press is used to stamp sheet blanks measuring approximately 22 inches × 28 inches × 0.09 – 0.1 inch into automobile exterior roof panels. The blanks are preheated in an infrared heating oven to a temperature of about 400°F., loaded into a cold die maintained at a temperature of about 60 – 70°F. and rapidly stamped into a finished part. The following results are obtained.

a. Stamped parts from Sheets I and VII — surfaces are slightly rough, but improved over parts stamped from sheet using only mat E. Fiber glass flow to edges of part is very good. Some fiber glass pattern is evident.

b. Stamped parts from Sheets II, III, V and VI — smoothness of surface faced with unstranded filaments, is excellent. This surface is as smooth as glass. Very good flow of glass to edges of parts. No fiber pattern is evident on surface faced with unstranded filaments.

c. Stamped parts from Sheet IV — blanks heated more uniformly and faster than blanks using only mat E. Glass/resin flow to edges of part is excellent. Compared to parts stamped from sheet using only mat E, the stamped parts from Sheet IV are very smooth, have a non-sandy hand and are free from wrinkles (wrinkled glass), pits, worm-holes and sink marks.

d. Stamped parts from Sheets VIII and IX — mat E did not flow to edges of part. Mat B and mat D flowed very well. The surface adjacent mat B was excellent.

Similar results to the above are obtained with resins other than polypropylene resin and styrene acrylonitrile resin. Examples of thermoplastic resins which are suited for use in this invention include both homopolymeric and copolymeric substances, such as (1) vinyl resins formed by the polymerization of vinyl halides or by the copolymerization of vinyl halides with unsaturated polymerizable compounds, e.g., vinyl esters, α,B-unsaturated acids, α,B-unsaturated esters, α,B-unsaturated ketones, α,B-unsaturated aldehydes and unsaturated hydrocarbons such as butadienes and styrenes; (2) poly-α-olefins such as polyethylene, polypropylene, polybutylene, polyisoprene and the like, including copolymers of poly-α-olefins; (3) phenoxy resins; (4) polyamides such as polyhexamethylene adipamide, poly-ε-caprolactam and the like, including copolymers of polyamides; (5) polysulfones; (6) polycarbonates; (7) polyacetals; (8) polyethylene oxide; (9) polystyrene, including copolymers of styrene with monomeric compounds such as acrylonitrile and butadiene; (10) acrylic resins as exemplified by the polymers of methyl acrylate, acrylamide, methylol acrylamide, acrylonitrile and copolymers of these with styrene, vinyl pyridines, etc.; (11) neoprene; (12) polyphenylene oxide resins; and (13) cellulose esters including the nitrate, acetate, propionate, etc. This list is not meant to be limiting or exhaustive but merely to illustrate the wide range of polymeric materials which may be employed in the present invention.

The term "mat of unstranded filaments" as used herein is intended to include a mat composed of monofilaments as well as a mat composed of very fine strands of from 1 to 10 filaments, preferably of from 1 to 5 filaments to a strand bundle. The filament diameter may range from about 0.00003 to 0.002 inch.

Although the invention is described with regard to specific details of certain preferred embodiments, it is not intended that such details shall serve as limitations on the scope of the invention except as set forth in the accompanying claims. For example, needling of fiber glass mats is employed herein in a large measure to facilitate the handling of the mats in preparing laminated resin-fiber sheet. However, depending on the process and apparatus employed for laminating, some or all of the needling may be eliminated or increased while still achieving the advantages of this invention. Moreover, resin impregnation of laminates may be accomplished by doctoring, extruding or otherwise providing the resin in a form different from a resinous sheet.

I claim:

1. A method of making a stampable, reinforced thermoplastic resinous sheet comprising impregnating with a thermoplastic composition a composite fibrous mat structure, said structure being binder free before impregnation and containing a mat of fibrous glass strands free of binder and a mat of unstranded glass filaments free of binder, said mats being disposed one above the other and contiguous with each other to thereby form said composite fibrous mat structure and wherein the unstranded glass filaments are free to move relative to each other when the thermoplastic composition impregnates said fibrous mat structure and is in a flowable state and forming the resinous fibrous mat structure and thermoplastic impregnant into the shape of a sheet.

2. The method of claim 1 in which the sheet so formed is cut into a blank, the blank is heated and the heated blank is stamped into the form of a desired product.

* * * * *